(12) United States Patent
Yang (10) Patent No.: US 11,750,697 B2
(45) Date of Patent: Sep. 5, 2023

(54) MESSAGE TRANSMISSION METHOD AND RELATED DEVICES

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 162 days.

(21) Appl. No.: 17/503,230

(22) Filed: Oct. 15, 2021

(65) Prior Publication Data

US 2022/0038531 A1 Feb. 3, 2022

Related U.S. Application Data

(63) Continuation of application No. PCT/CN2020/083532, filed on Apr. 7, 2020.

(30) Foreign Application Priority Data

Apr. 18, 2019 (CN) .......................... 201910314887.4

(51) Int. Cl.
*H04L 67/104* (2022.01)
*H04W 4/08* (2009.01)
(Continued)

(52) U.S. Cl.
CPC ............. *H04L 67/104* (2013.01); *H04W 4/08* (2013.01); *H04W 76/14* (2018.02); *H04W 84/18* (2013.01)

(58) Field of Classification Search
None
See application file for complete search history.

(56) References Cited

U.S. PATENT DOCUMENTS

| 11,063,786 B2 * | 7/2021 | Samudrala ............ H04W 88/16 |
| 2007/0177592 A1 | 8/2007 | Mooney |
| 2019/0380005 A1 * | 12/2019 | Eashwaramoorthy .. H04W 4/08 |

FOREIGN PATENT DOCUMENTS

| CN | 1864366 | 11/2006 |
| CN | 101765185 | 6/2010 |

(Continued)

OTHER PUBLICATIONS

Konstantin Mikhaylov, Juha Petäjäjärvi, Jussi Haapola and Ari Pouttu, D2D Communications in LoRaWAN Low Power Wide Area Network: From Idea to Empirical Validation, pp. 1-6, Jul. 3 (Year: 2017).*

(Continued)

*Primary Examiner* — Christopher M Crutchfield
(74) *Attorney, Agent, or Firm* — Hodgson Russ LLP (57) ABSTRACT

A message transmission method and related devices are provided in the disclosure. The method includes the following. A first long range (LoRa) device creates a LoRa mesh group. Based on a peer-to-peer (P2P) communication requirement with a second LoRa device belonging to the LoRa mesh group, the first LoRa device switches to a P2P communication mode, transmits a mode switching instruction to the second LoRa device, and increases a transmission priority associated with a target message type to a predetermined transmission priority. The mode switching instruction is used to instruct the second LoRa device to switch to the P2P communication mode. The target message type is the type of a message that needs to be transmitted in P2P communication between the first LoRa device and the second LoRa device. The first LoRa device transmits a message of the target message type to the second LoRa device.

20 Claims, 6 Drawing Sheets

(51) Int. Cl.
*H04W 76/14* (2018.01)
*H04W 84/18* (2009.01)

(56) References Cited

FOREIGN PATENT DOCUMENTS

| | | | | |
|---|---|---|---|---|
| CN | 104812090 | | 7/2015 | |
| CN | 106559311 | | 4/2017 | |
| CN | 107509176 | | 12/2017 | |
| CN | 108307355 | | 7/2018 | |
| CN | 109195116 | | 1/2019 | |
| CN | 109195195 | | 1/2019 | |
| CN | 109286998 | | 1/2019 | |
| CN | 109286998 A | * | 1/2019 | ............ H04B 1/40 |
| CN | 109451454 | | 3/2019 | |
| CN | 109412937 B | * | 1/2021 | ............ H04L 12/66 |
| CN | 112423365 B | * | 1/2021 | |
| CN | 108882250 B | * | 6/2022 | ............ H04W 16/18 |
| WO | 2018125287 | | 7/2018 | |

OTHER PUBLICATIONS

Jaehyu Kim and JooSeok Song, A Secure Device-to-Device Link Establishment Scheme for LoRaWAN, pp. 1-9, Mar. 1 (Year: 2018).*
CNIPA, First Office Action for CN Application No. 201910314887.4, dated Jan. 20, 2021.
Zhu et al., "Improving the Capacity of a Mesh LoRa Network by Spreading-Factor-Based Network Clustering," IEEE Access, 2019, vol. 7, pp. 21584-21596.
WIPO, International Search Report for PCT/CN2020/083532, dated Jun. 29, 2020.
Pham et al., "Method for Organizing Mesh Topology based on LoRa Technology," 10th International Congress on Ultra Modern Telecommunications and Control Systems and Workshops (ICUMT), 2018.
EPO, Extended European Search Report for EP Application No. 20790930.0, dated May 11, 2022.

* cited by examiner

MESSAGE TRANSMISSION METHOD AND RELATED DEVICES

CROSS-REFERENCE TO RELATED APPLICATION(S)

This application is a continuation of International Application No. PCT/CN2020/083532, filed on Apr. 7, 2020, which claims priority to Chinese Patent Application No. 201910314887.4, filed on Apr. 18, 2019, the entire disclosures of which are incorporated herein by reference.

TECHNICAL FIELD

This disclosure relates to the field of electronic technology, and particularly to a message transmission method and related devices.

BACKGROUND

Long range (LoRa) is a low-power local area network wireless standard. Lora is widely used in Internet of Things and other fields because of its characteristics of long transmission distance and strong anti-interference. At present, LoRa technology can support mobile terminals (such as smart phones, tablet computers, etc.) to communicate in places without mobile base stations.

SUMMARY

In a first aspect of the disclosure, a message transmission method is provided. The message transmission method includes the following. A first long range (LoRa) device creates a LoRa mesh group. Based on a peer-to-peer (P2P) communication requirement with a second LoRa device belonging to the LoRa mesh group, the first LoRa device switches to a P2P communication mode, transmits a mode switching instruction to the second LoRa device, and increases a transmission priority associated with a target message type to a predetermined transmission priority. The mode switching instruction is used to instruct the second LoRa device to switch to the P2P communication mode. In the P2P communication mode, a LoRa device exits a LoRa mesh group that the LoRa device belongs to. The target message type is the type of a message that needs to be transmitted in P2P communication between the first LoRa device and the second LoRa device. The first LoRa device transmits a message of the target message type to the second LoRa device.

In a second aspect of the disclosure, a LoRa device is provided. The LoRa device includes a transceiver, a processor, and a memory. The memory is coupled to the processor and stores one or more programs which, when executed by the processor, cause the processor to execute the following operations. A LoRa mesh group is created. Based on a P2P communication requirement with a second LoRa device belonging to the LoRa mesh group, switch to a P2P communication mode, the transceiver transmits a mode switching instruction to the second LoRa device, and a transmission priority associated with a target message type is increased to a predetermined transmission priority. The mode switching instruction is used to instruct the second LoRa device to switch to the P2P communication mode. In the P2P communication mode, a LoRa device exits a LoRa mesh group that the LoRa device belongs to. The target message type is the type of a message that needs to be transmitted in P2P communication between the LoRa device and the second LoRa device. The transceiver transmits a message of the target message type to the second LoRa device.

In a third aspect of the disclosure, a non-transitory computer-readable storage medium is provided. The non-transitory computer-readable storage medium stores computer programs which, when executed by a processor, cause the processor to execute all or part of the operations of the method described in the first aspect.

BRIEF DESCRIPTION OF THE DRAWINGS

In order to describe technical solutions of implementations of the disclosure or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

DETAILED DESCRIPTION

Hereinafter, implementations of the disclosure will be described in detail.

According to implementations of the disclosure, a message transmission method is provided. The message transmission method includes the following. A first long range (LoRa) device creates a LoRa mesh group. Based on a peer-to-peer (P2P) communication requirement with a second LoRa device belonging to the LoRa mesh group, the first LoRa device switches to a P2P communication mode, transmits a mode switching instruction to the second LoRa device, and increases a transmission priority associated with a target message type to a predetermined transmission priority. The mode switching instruction is used to instruct the second LoRa device to switch to the P2P communication mode. In the P2P communication mode, a LoRa device exits a LoRa mesh group that the LoRa device belongs to. The target message type is the type of a message that needs to be transmitted in P2P communication between the first LoRa device and the second LoRa device. The first LoRa device transmits a message of the target message type to the second LoRa device.

In some implementations, the method further includes the following. After creating the LoRa mesh group, the first LoRa device displays a group chat interface corresponding to the LoRa mesh group. On the group chat interface, a location of each LoRa device in the LoRa mesh group is displayed dynamically through an identifier, and a distance between the first LoRa device and each LoRa device in the LoRa mesh group other than the first LoRa device is displayed dynamically.

In some implementations, the method further includes the following. In response to detecting a first touch operation against an identifier of the second LoRa device displayed on a group chat interface corresponding to the LoRa mesh group, the first LoRa device determines to perform P2P communication with the second LoRa device.

In some implementations, the message of the target message type is transmitted to the second LoRa device as follows. A relay request is transmitted to a third LoRa device. The relay request carries the message of the target message type and the transmission priority of the target message type. The relay request is used to request relay transmission of the message of the target message type according to the transmission priority of the target message type. The third LoRa device belongs to the LoRa mesh group.

In some implementations, the method further includes the following. Before transmitting the relay request to the third LoRa device, in response to detecting a second touch operation against an identifier of the third LoRa device displayed on a group chat interface corresponding to the LoRa mesh group, the first LoRa device determines the third LoRa device as a relay device for communication between the first LoRa device and the second LoRa device.

In some implementations, the method further includes the following. Before transmitting the relay request to the third LoRa device, the first LoRa device determines the third LoRa device as a relay device for communication between the first LoRa device and the second LoRa device. A distance between the third LoRa device and the first LoRa device is less than a first distance, and a distance between the third LoRa device and the second LoRa device is less than the first distance.

In some implementations, the method further includes the following. Before transmitting the relay request to the third LoRa device, the first LoRa device determines that a distance between the first LoRa device and the second LoRa device is greater than or equal to a second distance, wherein the second distance is greater than the first distance.

In some implementations, the method further includes the following. After transmitting the message of the target message type to the second LoRa device, the first LoRa device switches to a mesh networking mode after communication between the first LoRa device and the second LoRa device is completed. In the mesh networking mode, a LoRa device rejoins a LoRa mesh group that the LoRa device exited.

In some implementations, the target message type includes at least one of call, voice, video, or text.

According to implementations of the disclosure, a LoRa device is provided. The LoRa device includes a transceiver, a processor, and a memory. The memory is coupled to the processor and stores one or more programs which, when executed by the processor, cause the processor to execute all or part of the operations of the method described in the foregoing method implementations.

According to implementations of the disclosure, a non-transitory computer-readable storage medium is provided. The non-transitory computer-readable storage medium stores computer programs which, when executed by a processor of a LoRa device, cause the processor to execute all or part of the operations of the method described in the foregoing method implementations.

Figure 1:
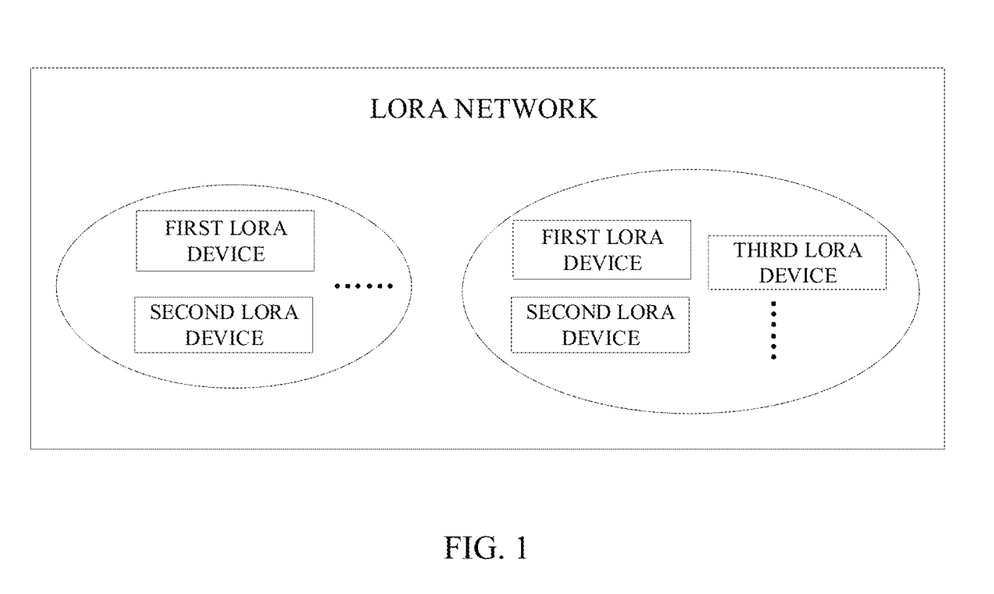
FIG. 1 is a schematic structural diagram illustrating a message transmission system provided in implementations of the disclosure.

FIG. 1 is a schematic diagram illustrating a network architecture of a LoRa network provided in implementations of the disclosure. The LoRa network may include multiple LoRa devices. For example, the LoRa network includes a first LoRa device, a second LoRa device, and a third LoRa device described below. Each of the multiple LoRa devices includes a LoRa module. The first LoRa device in the LoRa network creates a LoRa mesh group. The first LoRa device may create one or multiple LoRa mesh groups. Then remaining LoRa devices among the multiple LoRa devices join the LoRa mesh group created by the first LoRa device. If the first LoRa device creates multiple LoRa mesh groups, a LoRa device can join one of the multiple LoRa mesh groups, or join all or part of the multiple LoRa mesh groups. A LoRa device can communicate with other LoRa devices in the same LoRa mesh group as the LoRa device through a relay device in the LoRa mesh group that the LoRa device belongs to. The relay device in the LoRa mesh group is a LoRa device in the LoRa mesh group. One or multiple relay devices may be configured in the LoRa mesh group.

LoRa technology is a kind of low-power wide-area communication, and can support Time of Flight (TOF). TOF is used to measure a distance between two objects. LoRa technology is an ultra-long-distance wireless transmission technology based on spread spectrum technology, and has advantages of low power consumption, wide coverage, and strong signal penetration compared to similar technologies.

"LoRa device" in implementations of the disclosure may include various handheld devices, on-board devices, wearable devices, computing devices with wireless communication functions, or other processing devices connected to a wireless modem, as well as various forms of user equipment (UE), mobile stations (MS), terminal devices, etc.

FIG. 1 illustrates a scenario in which the first LoRa device in the LoRa network creates two LoRa mesh groups, and the second LoRa device in the LoRa network joins the two LoRa mesh groups created by the first LoRa device.

In implementations of the disclosure, when the first LoRa device needs to perform P2P communication with the second LoRa device corresponding to the first member in the LoRa mesh group, the first LoRa device switches to the P2P communication mode. The first LoRa device notifies the second LoRa device to switch to the P2P communication mode. The first LoRa device increases a transmission priority of the type of a message that needs to be transmitted in P2P communication between the first LoRa device and the second LoRa device. The first LoRa device transmits to the second LoRa device a message that needs to be P2P communicated. As can be seen, once switched to P2P communication, the transmission priority of the type of the message that needs to be transmitted in P2P communication is increased, as such, a message of this type is transmitted preferentially, thereby reducing delay in message transmission.

Figure 2:
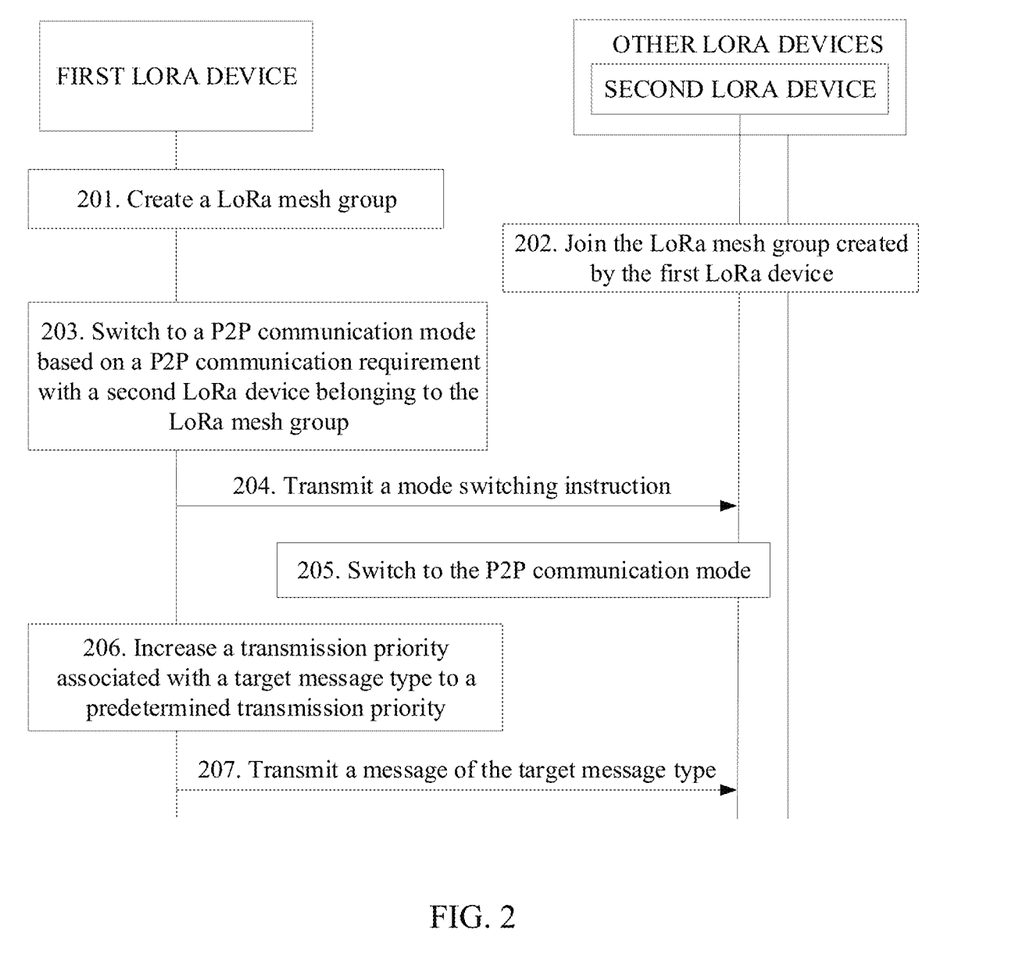
FIG. 2 is a schematic flowchart illustrating a message transmission method provided in implementations of the disclosure.

FIG. 2 illustrates a message transmission method provided in implementations of the disclosure. As illustrated in FIG. 2, the method includes the following.

At block 201, a first LoRa device creates a LoRa mesh group.

Figure 3:
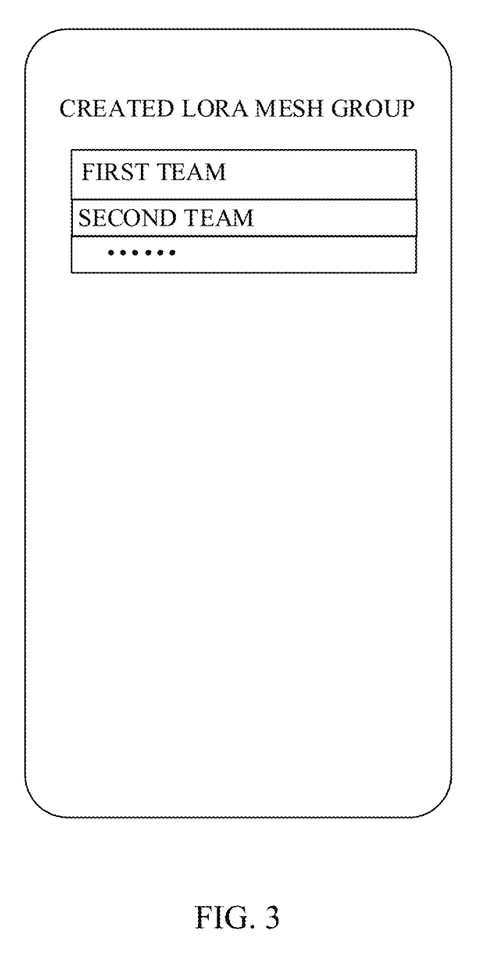
FIG. 3 is a schematic diagram illustrating a group chat interface provided in implementations of the disclosure.

The first LoRa device may create one or multiple LoRa mesh groups, which is not limited herein. As illustrated in FIG. 3, the LoRa mesh group created by the first LoRa device includes a first team, a second team, and so on.

At block 202, other LoRa devices join the LoRa mesh group created by the first LoRa device.

A LoRa device can join one or multiple LoRa mesh groups, which is not limited herein.

At block 203, based on a P2P communication requirement with a second LoRa device corresponding to a first member in the LoRa mesh group, the first LoRa device switches to a P2P communication mode.

At block 204, the first LoRa device transmits a mode switching instruction to the second LoRa device. The mode switching instruction is used to instruct the second LoRa device to switch to the P2P communication mode.

At block 205, the second LoRa device receives the mode switching instruction from the first LoRa device and switches to the P2P communication mode.

In the P2P communication mode, a LoRa device exits a LoRa mesh group that the LoRa device belongs to. As an example, a LoRa mesh group that the first LoRa device belongs to includes a first team and a second team, and a LoRa mesh group that the second LoRa device belongs to includes the first team. After the first LoRa device switches to the P2P communication mode, the first LoRa device exits the first team and the second team, and the second LoRa device exits the first team.

At block 206, the first LoRa device increases a transmission priority associated with a target message type to a predetermined transmission priority. The target message type is the type of a message that needs to be transmitted in P2P communication between the first LoRa device and the second LoRa device.

The target message type may be at least one of call, voice, video, text, or other types, which is not limited herein.

The predetermined transmission priority may be the highest transmission priority or other transmission priorities, which is not limited herein.

At block 207, the first LoRa device transmits a message of the target message type to the second LoRa device.

Specifically, the first LoRa device may transmit the message of the target message type to the second LoRa device directly, or transmit the message of the target message type to the second LoRa device through a relay device, which is not limited herein.

It should be noted that, the operations at block 203, block 204, and block 206 may be performed in parallel or may not be performed in parallel, which is not limited in the disclosure. As an example, the operation at block 203 is performed first, then the operation at block 204 is performed, and finally the operation at block 206 is performed. As another example, the operation at block 206 is performed first, then the operation at block 203 is performed, and finally the operation at block 204 is performed. As yet another example, the operation at block 204 is performed first, then the operation at block 203 is performed, and finally the operation at block 206 is performed.

In some implementations, the method further includes the following. When the first LoRa device needs to perform P2P communication with the second LoRa device corresponding to the first member in the LoRa mesh group, the first LoRa device displays a dialog box to prompt to input the type of a message that needs to be transmitted in P2P communication between the first LoRa device and the second LoRa device, or displays multiple message types in a dialog box to prompt to select the type of a message that needs to be transmitted in P2P communication between the first LoRa device and the second LoRa device.

Since mode switching of the first LoRa device, notifying the second LoRa device to perform mode switching, and message processing all take time, there may be delay in message transmission in P2P communication. Therefore, in implementations of the disclosure, the transmission priority of the type of the message that needs to be transmitted in P2P communication is increased once switched to P2P communication, so that a message of this type is transmitted preferentially, thereby reducing delay in message transmission.

In some implementations, the method further includes the following. After the first LoRa device creates the LoRa mesh group, the first LoRa device displays a group chat interface corresponding to the LoRa mesh group. On the group chat interface, a location of each member in the LoRa mesh group is displayed dynamically through an identifier, and a distance between each member in the LoRa mesh group and the first LoRa device is displayed dynamically.

In some implementations, upon detecting a third touch operation against the name of the LoRa mesh group, the first LoRa device displays the group chat interface corresponding to the LoRa mesh group.

The third touch operation herein may be a click operation, a double-click operation, a slide operation, and so on.

As an example, the first LoRa device displays an interface illustrated in FIG. 3. Upon detecting a click operation against "first team", the first LoRa device displays a group chat interface corresponding to "first team". Upon detecting a slide operation against "first team" and "second team" (e.g., slide from "first team" to "second team" with a finger), the first LoRa device displays a group chat interface corresponding to "first team" and a group chat interface corresponding to "second team".

Figure 4:
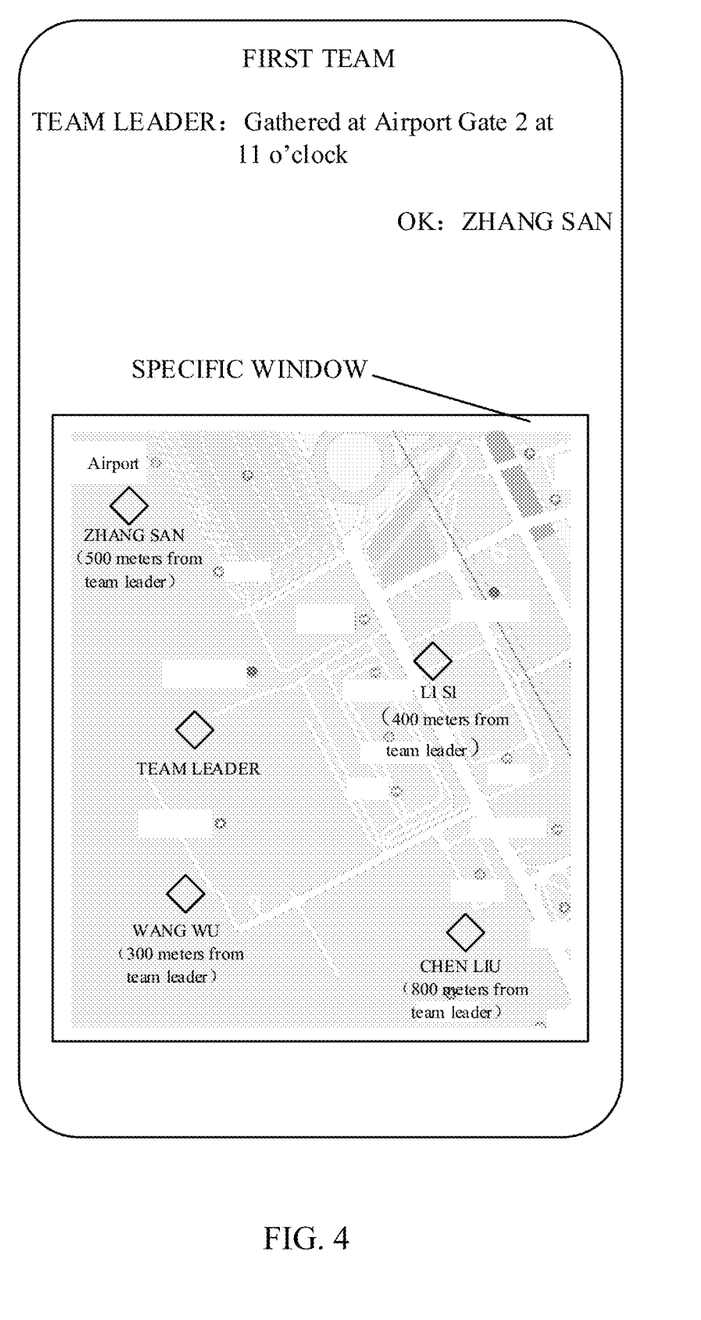
FIG. 4 is a schematic diagram illustrating a group chat interface provided in other implementations of the disclosure.

In some implementations, the location of each member and the distance between each member and the first LoRa device are displayed in a specific window of the group chat interface (as illustrated in FIG. 4). In addition, in addition to the distance between each member and the first LoRa device and the location of each member, a message posted by each member can also be displayed on the group chat interface (as illustrated in FIG. 4). In FIG. 4, a team leader is a member corresponding to the first LoRa device.

In some implementations, the specific window displays a simplified map showing the location of each member and the distance between each member and the first LoRa device, or displays a map of a map application installed on the first LoRa device, where the map shows the location of each member and the distance between each member and the first LoRa device (as illustrated in FIG. 4).

It should be noted that, a LoRa device other than the first LoRa device can also display a group chat interface corresponding to a LoRa mesh group that the LoRa device belongs to. As an example, the second LoRa device joins "first team", then the second LoRa device can display a group chat interface corresponding to "first team". As another example, the second LoRa device joins "first team" and "second team", then the second LoRa device can display a group chat interface corresponding to "first team" and a group chat interface corresponding to "second team". In addition, displaying of the group chat interface on other LoRa devices is triggered in a similar manner to displaying of the group chat interface on the first LoRa device, which will not be repeated herein.

As can be seen, in implementations of the disclosure, information related to a LoRa mesh group can be displayed on a group chat interface, so that members in the LoRa mesh group can straightforwardly learn the information related to the LoRa mesh group.

In some implementations, the method further includes the following. Upon detecting a first touch operation against an identifier of the first member displayed on the group chat interface, the first LoRa device determines that the first LoRa device needs to perform P2P communication with the second LoRa device.

The first touch operation may be a click operation, a double-click operation, a drag operation, a click and drag operation, a double-click and drag operation, etc., which is not limited herein.

As an example, the first touch operation is a double-click operation. As illustrated in FIG. 4, the team leader can double-click an identifier of a member (e.g., "Li Si") to trigger P2P communication between the team leader and the member.

As can be seen, in implementations of the disclosure, P2P communication between the first LoRa device and a LoRa device corresponding to a certain member can be triggered by touching an identifier of the member, which is easy to operate and improves convenience of P2P communication switching.

In some implementations, identifiers of members are displayed in the specific window, and the method further includes the following. Upon detecting that an identifier of the first member (corresponding to the second LoRa device) and an identifier of a third member corresponding to the first LoRa device are dragged out of the specific window, the first LoRa device determines that the first LoRa device needs to perform P2P communication with the second LoRa device.

As an example, as illustrated in FIG. 4, the team leader can drag an identifier of the team leader and an identifier of a member (e.g., "Li Si") out of the specific window to trigger communication between the team leader and the member.

As can be seen, in implementations of the disclosure, P2P communication between the first LoRa device and a LoRa device corresponding to a certain member can be triggered by dragging an identifier of the member and an identifier of the third member corresponding to the first LoRa device out of the specific window, which is easy to operate and improves convenience of P2P communication switching.

In some implementations, the first LoRa device transmits the message of the target message type to the second LoRa device as follows. The first LoRa device transmits a relay request to a third LoRa device. The relay request carries the message of the target message type and the transmission priority of the target message type. The relay request is used to request relay transmission of the message of the target message type according to the transmission priority of the target message type. The third LoRa device corresponds to a second member in the LoRa mesh group.

In some implementations, the method further includes the following. Before the first LoRa device transmits the relay request to the third LoRa device, the first LoRa device determines that a distance between the first LoRa device and the second LoRa device is greater than or equal to a second distance. The second distance is greater than a first distance.

In some implementations, the method further includes the following. Before the first LoRa device transmits the relay request to the third LoRa device, upon detecting a second touch operation against an identifier of the second member displayed on the group chat interface, the first LoRa device determines the third LoRa device as a relay device for communication between the first LoRa device and the second LoRa device.

The second touch operation is different from the first touch operation. The second touch operation may be a click operation, a double-click operation, a drag operation, a click and drag operation, etc., which is not limited herein.

In some implementations, the method further includes the following. Before detecting the second touch operation against the identifier of the second member displayed on the group chat interface, the first LoRa device outputs first prompt information. The first prompt information is used to prompt that the first LoRa device is far away from the second LoRa device, and prompt to select the relay device for communication between the first LoRa device and the second LoRa device.

In some implementations, the method further includes the following. Before the first LoRa device transmits the relay request to the third LoRa device, the first LoRa device determines the third LoRa device as a relay device for communication between the first LoRa device and the second LoRa device. A distance between the third LoRa device and the first LoRa device is less than a first distance. A distance between the third LoRa device and the second LoRa device is less than the first distance.

In some implementations, the method further includes the following. When the distance between the first LoRa device and the second LoRa device is less than the second distance, the first LoRa device transmits the message of the target message type to the second LoRa device directly.

As can be seen, in implementations of the disclosure, whether a relay device is required in communication between the first LoRa device and the second LoRa device is determined according to the actual situation, which can ensure accuracy of message transmission.

In some implementations, the method further includes the following. After the first LoRa device transmits the message of the target message type to the second LoRa device and communication between the first LoRa device and the second LoRa device is completed, the first LoRa device switches to a mesh networking mode. In the mesh networking mode, a LoRa device rejoins a LoRa mesh group that the LoRa device exited before.

As an example, a LoRa mesh group that the first LoRa device exited before includes a first team and a second team, and a LoRa mesh group that the second LoRa device exited before includes the first team. After the first LoRa device switches to the mesh networking mode, the first LoRa device rejoins the first team and the second team, and the second LoRa device rejoins the first team.

As can be seen, in implementations of the disclosure, after P2P communication is completed, LoRa devices for P2P communication can re-enter the mesh networking mode, so that these devices can follow up group situations in time.

In some implementations, the method further includes the following. After other LoRa devices join the LoRa mesh group created by the first LoRa device, for each of other LoRa devices: the LoRa device detects a LoRa signal strength in real time; the LoRa device outputs second prompt information upon detecting that the detected LoRa signal strength is less than a threshold, where the second prompt information is used to prompt that the current LoRa signal strength is relatively low and communication may not be maintained, and prompt to return to a location area defined by the LoRa mesh group in time; and the LoRa device outputs a location of another member currently closest to the LoRa device.

As can be seen, in implementations of the disclosure, when a LoRa device detects that a LoRa signal strength is relatively low, the LoRa device outputs prompt information in time, which can avoid occurrence of dangerous behaviors caused by members not being able to contact the LoRa mesh group.

Figure 5:
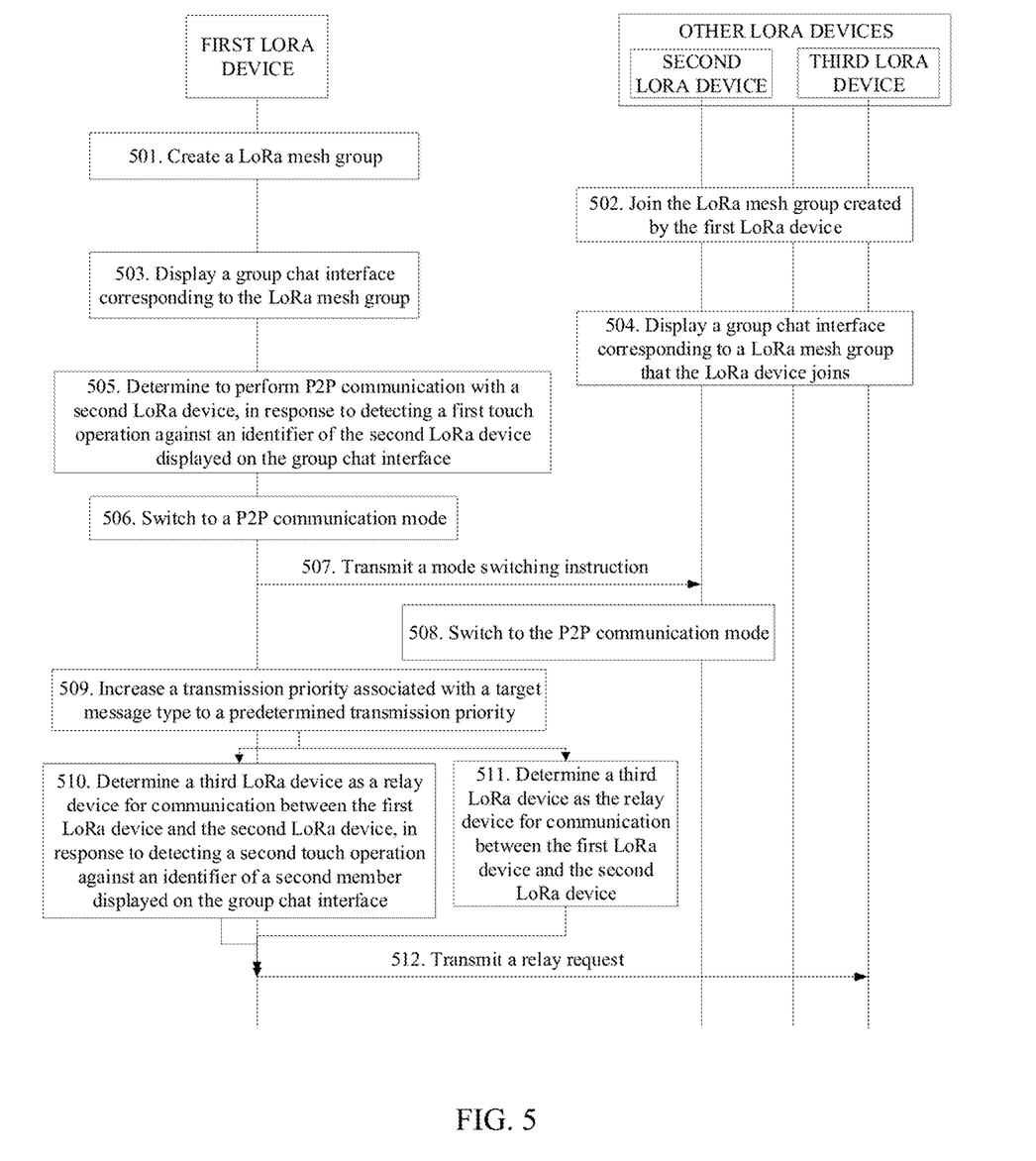
FIG. 5 is a schematic flowchart illustrating a message transmission method provided in other implementations of the disclosure.

FIG. 5 illustrates a message transmission method provided in other implementations of the disclosure. The method is for an electronic device. The method includes the following.

At block 501, the first LoRa device creates a LoRa mesh group. The first LoRa device performs the operation at block 503 after performing the operation at block 501.

At block 502, other LoRa devices join the LoRa mesh group created by the first LoRa device. Other LoRa devices perform the operation at block 504 after performing the operation at block 502.

At block 503, the first LoRa device displays a group chat interface corresponding to the LoRa mesh group. The first LoRa device performs the operation at block 505 after performing the operation at block 503.

At block 504, for each of other LoRa devices, the LoRa device displays a group chat interface corresponding to a LoRa mesh group that the LoRa device joins.

On the group chat interface, a location of each member in the LoRa mesh group is displayed dynamically through an identifier, and a distance between each member in the LoRa mesh group and the first LoRa device is displayed dynamically.

At block 505, upon detecting a first touch operation against an identifier of a first member displayed on the group chat interface, the first LoRa device determines that the first LoRa device needs to perform P2P communication with a second LoRa device.

At block 506, the first LoRa device switches to a P2P communication mode.

At block 507, the first LoRa device transmits a mode switching instruction to the second LoRa device. The mode switching instruction is used to instruct the second LoRa device to switch to the P2P communication mode.

At block 508, the second LoRa device receives the mode switching instruction from the first LoRa device and switches to the P2P communication mode.

In the P2P communication mode, a LoRa device exits a LoRa mesh group that the LoRa device belongs to.

At block 509, the first LoRa device increases a transmission priority associated with a target message type to a predetermined transmission priority. The target message type is the type of a message that needs to be transmitted in P2P communication between the first LoRa device and the second LoRa device. The first LoRa device performs the operation at block 510 or the operation at block 511 after performing the operation at block 509.

At block 510, upon detecting a second touch operation against an identifier of a second member displayed on the group chat interface, the first LoRa device determines a third LoRa device as a relay device for communication between the first LoRa device and the second LoRa device.

At block 511, the first LoRa device determines the third LoRa device as the relay device for communication between the first LoRa device and the second LoRa device. A distance between the third LoRa device and the first LoRa device is less than a first distance. A distance between the third LoRa device and the second LoRa device is less than the first distance.

At block 512, the first LoRa device transmits a relay request to the third LoRa device. The relay request carries the message of the target message type and the transmission priority of the target message type. The relay request is used to request relay transmission of the message of the target message type according to the transmission priority of the target message type. The third LoRa device corresponds to the second member in the LoRa mesh group.

It should be noted that, the operations at block 506, block 507, and block 509 may be performed in parallel or may not be performed in parallel, which is not limited in the disclosure. As an example, the operation at block 506 is performed first, then the operation at block 507 is performed, and finally the operation at block 509 is performed. As another example, the operation at block 507 is performed first, then the operation at block 506 is performed, and finally the operation at block 509 is performed. As yet another example, the operation at block 509 is performed first, then the operation at block 506 is performed, and finally the operation at block 507 is performed. For details of the operations at block 501-512, reference can be made to specific implementation processes described in the foregoing method implementations, and it will not be repeated herein.

Figure 6:
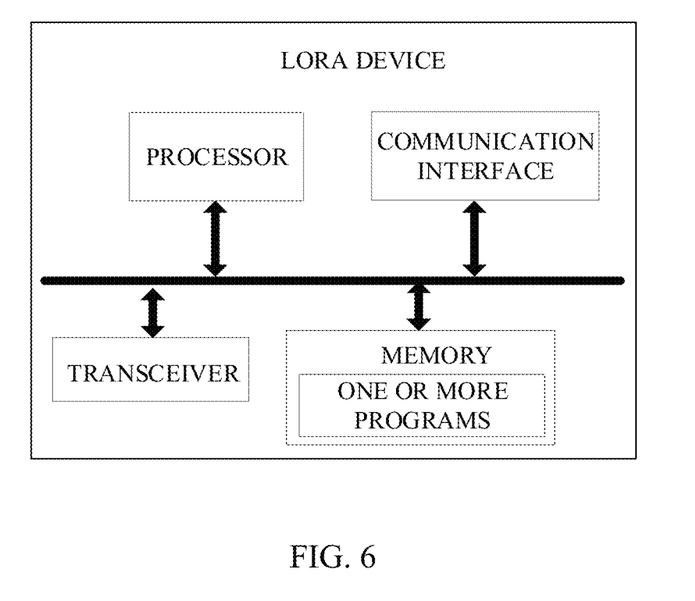
FIG. 6 is a schematic structural diagram illustrating a long range (LoRa) device provided in implementations of the disclosure.

Similar to the foregoing implementations described with reference to FIG. 2 and FIG. 5, FIG. 6 is a schematic structural diagram illustrating a LoRa device provided in implementations of the disclosure. As illustrated in FIG. 6, the LoRa device is embodied as a first LoRa device. The LoRa device further includes a transceiver, a processor, a memory, a communication interface, and one or more programs. The one or more programs are stored in the memory and configured to be executed by the processor. The programs include instructions which are operable with the processor to execute the following operations. A LoRa mesh group is created. Based on a P2P communication requirement with a second LoRa device corresponding to a first member in the LoRa mesh group, the first LoRa device switches to a P2P communication mode, transmits, with the transceiver, a mode switching instruction to the second LoRa device, and increases a transmission priority associated with a target message type to a predetermined transmission priority. The mode switching instruction is used to instruct the second LoRa device to switch to the P2P communication mode. In the P2P communication mode, a LoRa device exits a LoRa mesh group that the LoRa device belongs to. The target message type is the type of a message that needs to be transmitted in P2P communication between the first LoRa device and the second LoRa device. The first LoRa device transmits, with the transceiver, a message of the target message type to the second LoRa device.

In some implementations, the programs further include instructions which are operable with the processor to execute the following operations. After creating the LoRa mesh group, a group chat interface corresponding to the LoRa mesh group is displayed on the first LoRa device. On the group chat interface, a location of each member in the LoRa mesh group is displayed dynamically through an identifier, and a distance between each member in the LoRa mesh group and the first LoRa device is displayed dynamically.

In some implementations, the programs further include instructions which are operable with the processor to execute the following operations. In response to detecting a first touch operation against an identifier of the first member displayed on the group chat interface, the first LoRa device determines that the first LoRa device needs to perform P2P communication with the second LoRa device.

In some implementations, the instructions of the programs operable with the processor to transmit the message of the target message type to the second LoRa device are operable with the processor to execute the following operations. A relay request is transmitted to a third LoRa device. The relay request carries the message of the target message type and the transmission priority of the target message type. The relay request is used to request relay transmission of the message of the target message type according to the transmission priority of the target message type. The third LoRa device corresponds to a second member in the LoRa mesh group.

In some implementations, the programs further include instructions which are operable with the processor to execute the following operations. Before transmitting the relay request to the third LoRa device, in response to detecting a second touch operation against an identifier of the second member displayed on the group chat interface, the first LoRa device determines the third LoRa device as a relay device for communication between the first LoRa device and the second LoRa device.

In some implementations, the programs further include instructions which are operable with the processor to execute the following operations. Before transmitting the relay request to the third LoRa device, the third LoRa device is determined as a relay device for communication between the first LoRa device and the second LoRa device. A distance between the third LoRa device and the first LoRa device is less than a first distance, and a distance between the third LoRa device and the second LoRa device is less than the first distance.

In some implementations, the programs further include instructions which are operable with the processor to execute the following operations. Before transmitting the relay request to the third LoRa device, a distance between the first LoRa device and the second LoRa device is determined to be greater than or equal to a second distance, where the second distance is greater than the first distance.

In some implementations, the programs further include instructions which are operable with the processor to execute the following operations. After transmitting the message of the target message type to the second LoRa device, the first LoRa device switches to a mesh networking mode after communication between the first LoRa device and the second LoRa device is completed. In the mesh networking mode, a LoRa device rejoins a LoRa mesh group that the LoRa device exited before.

In some implementations, the target message type includes at least one of call, voice, video, or text.

It should be noted that, for details of these implementations, reference can be made to specific implementation processes described in the foregoing method implementations, and it will not be repeated herein.

According to the implementations of the disclosure, functional units may be divided for the electronic device in accordance with the foregoing method examples. For example, functional units may be divided according to corresponding functions, and two or more functions may be integrated into one processing unit. The above-mentioned integrated unit can be implemented in the form of hardware or software functional units. It should be noted that, the division of units in the implementations of the disclosure is schematic and is merely a logical function division; there may be other division manners in actual implementation.

Figure 7:
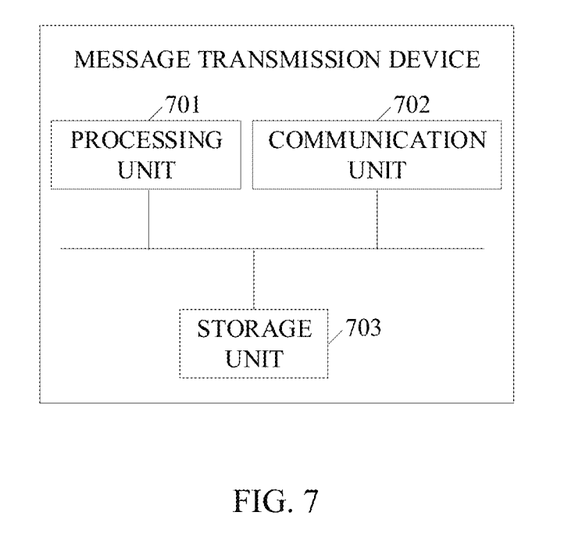
FIG. 7 is a schematic structural diagram illustrating a message transmission device provided in implementations of the disclosure.

The following are device implementations of the disclosure. The device of the device implementations are used to execute the method of the foregoing method implementations of the disclosure. FIG. 7 is a schematic structural diagram illustrating a message transmission device provided in implementations of the disclosure. The message transmission device is for a first LoRa device. The message transmission device includes a processing unit 701 and a communication unit 702. The processing unit 701 is configured to create a LoRa mesh group. Based on a P2P communication requirement with a second LoRa device corresponding to a first member in the LoRa mesh group, the processing unit 701 is configured to switch to a P2P communication mode, the communication unit 702 is configured to transmit a mode switching instruction to the second LoRa device, and the processing unit 701 is configured to increase a transmission priority associated with a target message type to a predetermined transmission priority. The mode switching instruction is used to instruct the second LoRa device to switch to the P2P communication mode. In the P2P communication mode, a LoRa device exits a LoRa mesh group that the LoRa device belongs to. The target message type is the type of a message that needs to be transmitted in P2P communication between the first LoRa device and the second LoRa device. The communication unit 702 is configured to transmit a message of the target message type to the second LoRa device.

In some implementations, the processing unit 701 is further configured to display a group chat interface corresponding to the LoRa mesh group after creating the LoRa mesh group. On the group chat interface, a location of each member in the LoRa mesh group is displayed dynamically through an identifier and a distance between each member in the LoRa mesh group and the first LoRa device is displayed dynamically.

In some implementations, the processing unit 701 is further configured to determine that the first LoRa device needs to perform P2P communication with the second LoRa device, in response to detecting a first touch operation against an identifier of the first member displayed on the group chat interface.

In some implementations, the communication unit 702 configured to transmit the message of the target message type to the second LoRa device is configured to transmit a relay request to a third LoRa device. The relay request carries the message of the target message type and the transmission priority of the target message type. The relay request is used to request relay transmission of the message of the target message type according to the transmission priority of the target message type. The third LoRa device corresponds to a second member in the LoRa mesh group.

In some implementations, the processing unit 701 is further configured to determine the third LoRa device as a relay device for communication between the first LoRa device and the second LoRa device in response to detecting a second touch operation against an identifier of the second member displayed on the group chat interface, before the communication unit 702 transmits the relay request to the third LoRa device.

In some implementations, the processing unit 701 is further configured to determine the third LoRa device as a relay device for communication between the first LoRa device and the second LoRa device, before the communication unit 702 transmits the relay request to the third LoRa device. A distance between the third LoRa device and the first LoRa device is less than a first distance, and a distance between the third LoRa device and the second LoRa device is less than the first distance.

In some implementations, the processing unit 701 is further configured to determine that a distance between the first LoRa device and the second LoRa device is greater than or equal to a second distance, before the communication unit 702 transmits the relay request to the third LoRa device. The second distance is greater than the first distance.

In some implementations, the processing unit 701 is further configured to switch to a mesh networking mode, after communication between the first LoRa device and the second LoRa device is completed and the communication unit 702 transmits the message of the target message type to the second LoRa device. In the mesh networking mode, a LoRa device rejoins a LoRa mesh group that the LoRa device exited before.

In some implementations, the target message type includes at least one of call, voice, video, or text.

It should be noted that, the message transmission device further includes a storage unit 703. The processing unit 701 may be a processor. The communication unit 702 may be a communication interface. The storage unit 703 may be a memory.

According to implementations of the disclosure, a non-transitory computer-readable storage medium is further provided. The non-transitory computer-readable storage medium is configured to store computer programs for electronic data interchange. The computer programs are operable with a computer to execute all or part of the operations of the method described in the foregoing method implementations.

According to implementations of the disclosure, a computer program product is further provided. The computer program product includes a non-transitory computer-readable storage medium configured to store computer programs. The computer programs are operable with a computer to execute all or part of the operations of the method described in the foregoing method implementations. The computer program product may be a software installation package.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the devices disclosed in implementations provided herein may be implemented in other manners. For example, the device implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to execute all or part of the operations described in the various implementations of the disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or part of the method of the implementations described above may be accomplished by means of a program to instruct associated hardware, the program may be stored in a computer-readable memory, which may include a flash memory, a ROM, a RAM, Disk or CD, and so on.

While the principles and implementations of the disclosure have been described in connection with illustrative implementations, it is to be understood that foregoing implementations are only used to help understand the method and core idea of the disclosure. As will occur to those skilled in the art, the disclosure is susceptible to various modifications and changes without departing from the spirit and principle of the disclosure. Therefore, the disclosure is not to be limited to the disclosed implementations.

What is claimed is:

1. A message transmission method performed by a first long range (LoRa) device, comprising:
   creating a LoRa mesh group;
   based on a peer-to-peer (P2P) communication requirement with a second LoRa device belonging to the LoRa mesh group,
   switching to a P2P communication mode;
   transmitting a mode switching instruction to the second LoRa device, wherein the mode switching instruction is used to instruct the second LoRa device to switch to the P2P communication mode, wherein in the P2P communication mode, a LoRa device exits a LoRa mesh group that the LoRa device belongs to; and
   increasing a transmission priority associated with a target message type to a predetermined transmission priority, wherein the target message type is the type of a message that needs to be transmitted in P2P communication between the first LoRa device and the second LoRa device; and
   transmitting a message of the target message type to the second LoRa device.

2. The message transmission method of claim 1, further comprising the following after creating the LoRa mesh group:

displaying a group chat interface corresponding to the LoRa mesh group, wherein on the group chat interface, a location of each LoRa device in the LoRa mesh group is displayed dynamically through an identifier, and a distance between the first LoRa device and each LoRa device in the LoRa mesh group other than the first LoRa device is displayed dynamically.

3. The message transmission method of claim 1, further comprising:
determining to perform P2P communication with the second LoRa device, in response to detecting a first touch operation against an identifier of the second LoRa device displayed on a group chat interface corresponding to the LoRa mesh group.

4. The message transmission method of claim 1, wherein transmitting the message of the target message type to the second LoRa device comprises:
transmitting a relay request to a third LoRa device, wherein the relay request carries the message of the target message type and the transmission priority of the target message type, and is used to request relay transmission of the message of the target message type according to the transmission priority of the target message type, wherein the third LoRa device belongs to the LoRa mesh group.

5. The message transmission method of claim 4, further comprising the following before transmitting the relay request to the third LoRa device:
determining the third LoRa device as a relay device for communication between the first LoRa device and the second LoRa device, in response to detecting a second touch operation against an identifier of the third LoRa device displayed on a group chat interface corresponding to the LoRa mesh group.

6. The message transmission method of claim 4, further comprising the following before transmitting the relay request to the third LoRa device:
determining the third LoRa device as a relay device for communication between the first LoRa device and the second LoRa device, wherein a distance between the third LoRa device and the first LoRa device is less than a first distance, and a distance between the third LoRa device and the second LoRa device is less than the first distance.

7. The message transmission method of claim 6, further comprising the following before transmitting the relay request to the third LoRa device:
determining that a distance between the first LoRa device and the second LoRa device is greater than or equal to a second distance, wherein the second distance is greater than the first distance.

8. The message transmission method of claim 1, further comprising the following after transmitting the message of the target message type to the second LoRa device:
switching to a mesh networking mode after communication between the first LoRa device and the second LoRa device is completed, wherein in the mesh networking mode, a LoRa device rejoins a LoRa mesh group that the LoRa device exited.

9. The message transmission method of claim 1, wherein the target message type comprises at least one of call, voice, video, or text.

10. A long range (LoRa) device, comprising:
a transceiver;
a processor; and
a memory, coupled to the processor and storing one or more programs which, when executed by the processor, cause the processor to:
create a LoRa mesh group;
based on a peer-to-peer (P2P) communication requirement with a second LoRa device belonging to the LoRa mesh group,
switch to a P2P communication mode;
transmit, with the transceiver, a mode switching instruction to the second LoRa device, wherein the mode switching instruction is used to instruct the second LoRa device to switch to the P2P communication mode, wherein in the P2P communication mode, a LoRa device exits a LoRa mesh group that the LoRa device belongs to; and
increase a transmission priority associated with a target message type to a predetermined transmission priority, wherein the target message type is the type of a message that needs to be transmitted in P2P communication between the LoRa device and the second LoRa device; and
transmit, with the transceiver, a message of the target message type to the second LoRa device.

11. The LoRa device of claim 10, wherein the processor is further configured to:
display a group chat interface corresponding to the LoRa mesh group after creating the LoRa mesh group, wherein on the group chat interface, a location of each LoRa device in the LoRa mesh group is displayed dynamically through an identifier, and a distance between the LoRa device and each LoRa device in the LoRa mesh group other than the LoRa device is displayed dynamically.

12. The LoRa device of claim 10, wherein the processor is further configured to:
determine to perform P2P communication with the second LoRa device, in response to detecting a first touch operation against an identifier of the second LoRa device displayed on a group chat interface corresponding to the LoRa mesh group.

13. The LoRa device of claim 10, wherein the processor configured to transmit the message of the target message type to the second LoRa device is configured to:
transmit, with the transceiver, a relay request to a third LoRa device, wherein the relay request carries the message of the target message type and the transmission priority of the target message type, and is used to request relay transmission of the message of the target message type according to the transmission priority of the target message type, wherein the third LoRa device belongs to the LoRa mesh group.

14. The LoRa device of claim 13, wherein the processor is further configured to:
before transmitting the relay request to the third LoRa device,
determine the third LoRa device as a relay device for communication between the LoRa device and the second LoRa device, in response to detecting a second touch operation against an identifier of the third LoRa device displayed on a group chat interface corresponding to the LoRa mesh group.

15. The LoRa device of claim 13, wherein the processor is further configured to:
before transmitting the relay request to the third LoRa device,
determine the third LoRa device as a relay device for communication between the LoRa device and the second LoRa device, wherein a distance between the third LoRa device and the LoRa device is less than a first distance, and a distance between the third LoRa device and the second LoRa device is less than the first distance.

16. The LoRa device of claim 15, wherein the processor is further configured to:
  before transmitting the relay request to the third LoRa device,
    determine that a distance between the LoRa device and the second LoRa device is greater than or equal to a second distance, wherein the second distance is greater than the first distance.

17. The LoRa device of claim 10, wherein the processor is further configured to:
  after transmitting the message of the target message type to the second LoRa device,
    switch to a mesh networking mode after communication between the LoRa device and the second LoRa device is completed, wherein in the mesh networking mode, a LoRa device rejoins a LoRa mesh group that the LoRa device exited.

18. The LoRa device of claim 10, wherein the target message type comprises at least one of call, voice, video, or text.

19. A non-transitory computer-readable storage medium, storing computer programs which, when executed by a processor of a long range (LoRa) device, cause the processor to carry out actions, comprising:
  creating a LoRa mesh group;
  based on a peer-to-peer (P2P) communication requirement with a second LoRa device belonging to the LoRa mesh group,
    switching to a P2P communication mode;
    transmitting a mode switching instruction to the second LoRa device, wherein the mode switching instruction is used to instruct the second LoRa device to switch to the P2P communication mode, wherein in the P2P communication mode, a LoRa device exits a LoRa mesh group that the LoRa device belongs to; and
    increasing a transmission priority associated with a target message type to a predetermined transmission priority, wherein the target message type is the type of a message that needs to be transmitted in P2P communication between the LoRa device and the second LoRa device; and
  transmitting a message of the target message type to the second LoRa device.

20. The non-transitory computer-readable storage medium of claim 19, wherein the computer programs executed by the processor to transmit the message of the target message type to the second LoRa device are executed by the processor to carry out actions, comprising:
  transmitting a relay request to a third LoRa device, wherein the relay request carries the message of the target message type and the transmission priority of the target message type, and is used to request relay transmission of the message of the target message type according to the transmission priority of the target message type, wherein the third LoRa device belongs to the LoRa mesh group.

* * * * *